United States Patent [19]

Divisi

[11] Patent Number: 5,010,767
[45] Date of Patent: Apr. 30, 1991

[54] MODULAR DEVICE FOR MEASURING THE VOLUMETRIC FLOW RATE OF A LIQUID, PARTICULARLY A LUBRICANT FLUID, IN A HYDRAULIC CIRCUIT

[75] Inventor: Gualtiero Divisi, Milan, Italy

[73] Assignee: Dropsa S.p.A., Italy

[21] Appl. No.: 427,742

[22] Filed: Oct. 26, 1989

[30] Foreign Application Priority Data

Nov. 25, 1988 [IT] Italy .............................. 22751 A/88

[51] Int. Cl.$^5$ .............................................. G01F 3/08
[52] U.S. Cl. ....................................................... 73/253
[58] Field of Search ................ 73/861.77, 861.78, 253, 73/254, 255, 256, 287

[56] References Cited

U.S. PATENT DOCUMENTS

| | | | |
|---|---|---|---|
| 3,040,578 | 6/1962 | Smith | 73/257 |
| 3,232,107 | 2/1966 | Busillo | 73/861.55 |
| 3,440,879 | 4/1969 | Frayssinoux | 73/257 |
| 3,662,600 | 5/1972 | Rosano, Jr. et al. | 73/257 |
| 3,981,194 | 9/1976 | Blise et al. | 73/253 |
| 4,007,635 | 2/1977 | Friebel | 73/253 |
| 4,399,709 | 8/1983 | Scharnitzky | 73/253 |
| 4,699,576 | 10/1987 | Durand | 73/256 |

FOREIGN PATENT DOCUMENTS 2043256 3/1972 Fed. Rep. of Germany .
840158 7/1960 United Kingdom .................. 73/253

*Primary Examiner*—Herbert Goldstein
*Attorney, Agent, or Firm*—Steinberg & Raskin

[57] ABSTRACT

A device for measuring the volumetric flow rate of a fluid, particularly a lubricant fluid in a hydraulic circuit, comprising a distributor block provided with an entry bore and an exit bore, and a feed duct and return duct respectively to and from a measurement block removably supported by the distributor block, the distributor block having elements therein for adjusting the fluid feed to the measurement block, the measurement block comprising interface elements between the two blocks, a member eccentrically orbiting within a chamber defined by the casing containing the measurement block and interface elements, and guide elements for the movement of the member. A sensor is connected to the measurement block to ascertain the movement of this member, this sensor being connected to an electronic microprocessor circuit arranged to determine the fluid volumetric flow rate through the distributor block.

17 Claims, 2 Drawing Sheets

MODULAR DEVICE FOR MEASURING THE VOLUMETRIC FLOW RATE OF A LIQUID, PARTICULARLY A LUBRICANT FLUID, IN A HYDRAULIC CIRCUIT

BACKGROUND OF THE INVENTION

This invention relates to a device for measuring the volumetric flow rate of a fluid in a hydraulic circuit. Various types of devices for measuring the volumetric flow rate of a fluid are available commerically. Such devices, and in particular those used for measuring the volumetric flow rate of a lubricant fluid, have a number of drawbacks the most serious of which is that they do not allow the volumetric flow rate of the fluid through the circuit to be accurately measured. Futhermore, many of these devices are very sensitive to the viscosity of the fluids passing through them, to the extent that for a given flow rate the indicated measurement can vary widely with change of fluid or rather its viscosity. Finally, many of the known devices easily develop mechanical faults which often prevent their proper operation.

SUMMARY OF THE INVENTION

An object of the present invention is to provide a device for measuring the volumetric flow rate of a fluid in a hydraulic circuit which obviates the drawbacks of analogous devices of the state of the art.

A particular object of the invention is to provide a reliable measurement device which is highly accurate in measuring the fluid flow rate.

These and further objects, which will be apparent to one skilled in the art are attained by a device for measuring the volumetric flow rate of a fluid, in particular a fluid in a hydraulic circuit, characterized by comprising:

(a) a circular rotor rotating eccentrically in a circular chamber under the action of the pressurized fluid which enters and leaves at different points of said chamber;

(b) a fixed sensor located close to a point of said circular chamber to sense the cyclic rotation of said rotor each time it comes into proximity to said point, with the result that the sensor generates a signal.

Advantageously, the measurement device is further, characterized by comprising a distributor block provided with an entry bore and an exit bore, and a feed duct and return duct respectively to and from a measurement block removably supported by the distributor block, in this measurement block there being provided the proximity sensor, the circular chamber and the rotor.

The device also comprises microprocessor means which, based on the proximity states measured by the sensor, evaluates the volumetric flow rate of the fluid passing through the distributor block.

BRIEF DESCRIPTION OF THE DRAWINGS

The present invention will be more apparent from the accompanying drawings, which are provided by way of non-limiting example and in which.

DESCRIPTION OF THE PREFERRED EMBODIMENTS

With reference to the figures, the illustrated device comprises a block 1 for distributing a fluid, such as a lubricant fluid, within a circuit for lubricating, for example, mechanical members.

The block 1, or distributor block, comprises a bore 2, threaded at 2A, for entry of the fluid into a channel 3 passing through the block 1. This channel 3 further comprises another bore 4, opposite the entry bore 2 and threaded at 4A, which can be closed by a conventional plug (not shown) or can receive a connection member (also not shown) to enable the block 1 to be connected to another similar block or, rather, to a pipe of the hydraulic circuit within which the device according to the invention is connected.

Figure 1:
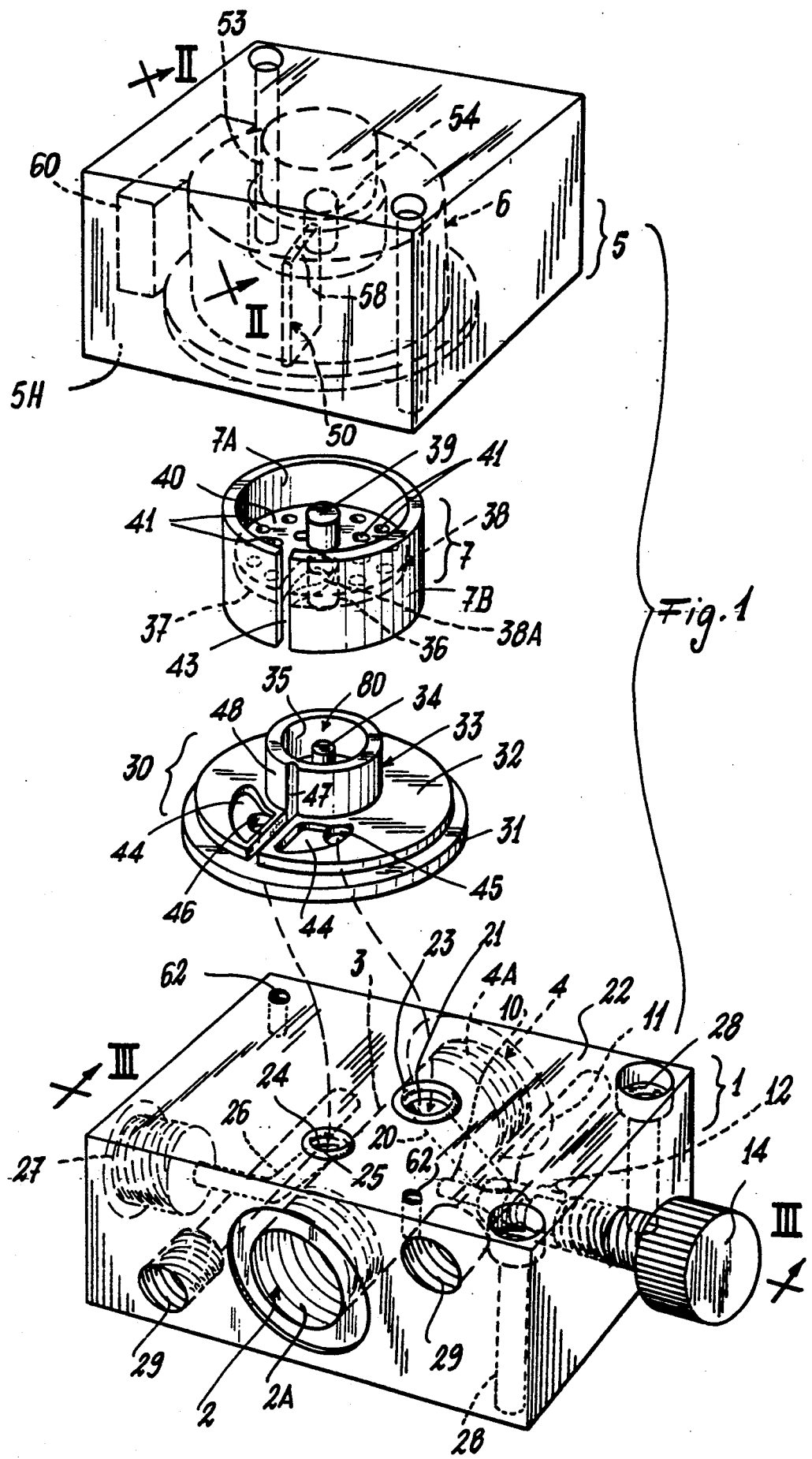
FIG. 1 is an exploded view of the device according to the present invention with some parts omitted for greater clarity.
Figure 2:
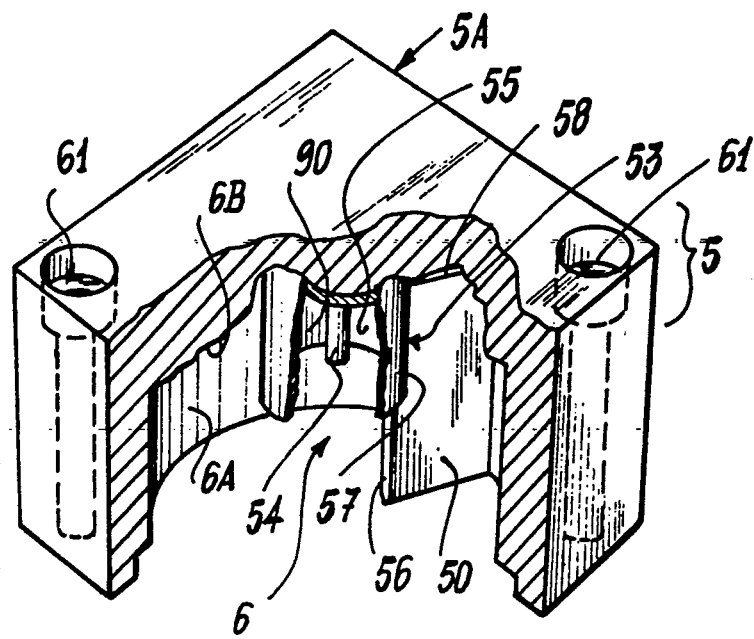
FIG. 2 is a sectional view of a part of the device according to the invention taken on the line II—II of FIG. 1.
Figure 3:
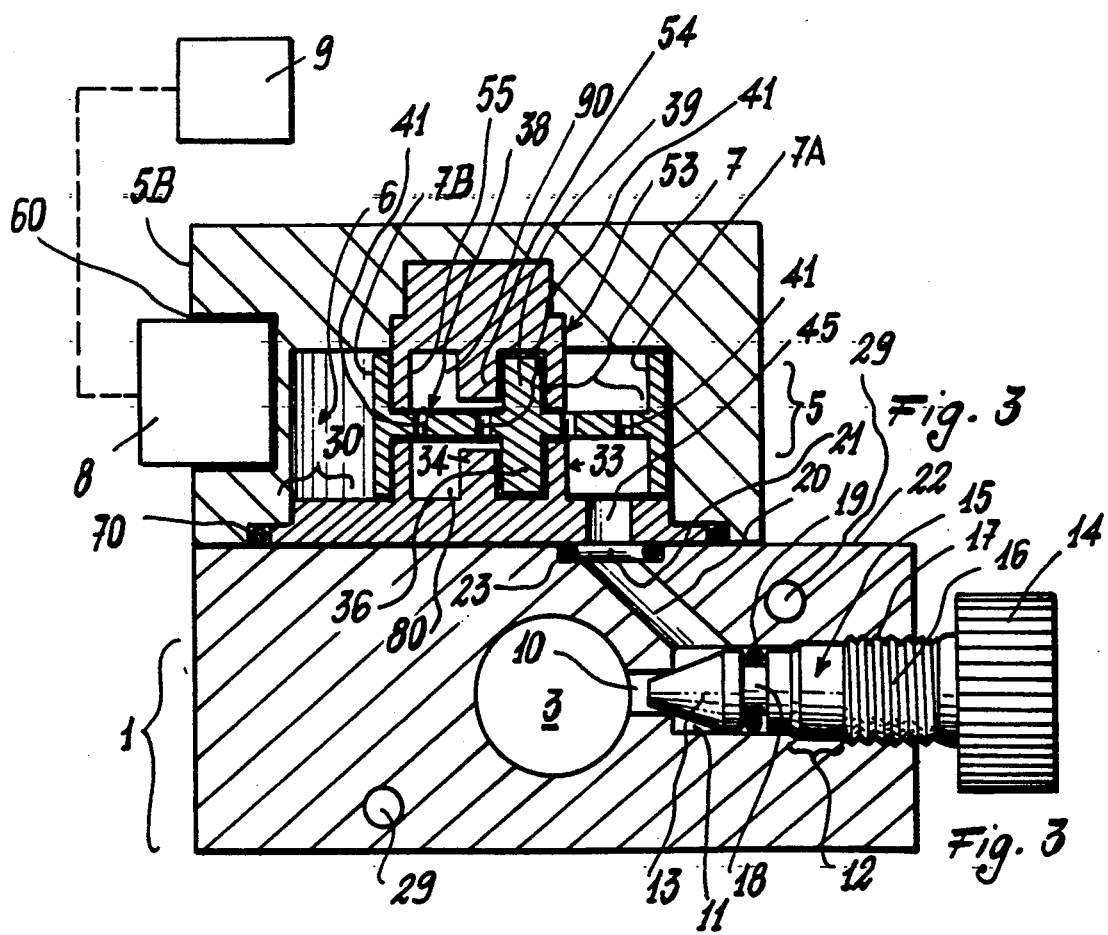
FIG. 3 is a sectional view of the assembled device taken on the line III—III of FIG. 1

The distributor block 1 supports a further block 5 through which, as will be seen hereinafter, at least part of the fluid entering the dustributor block 1 flows. Before its return to the distributor block 1, the fluid rotates a substantially cylindrical hollow member, hereinafter known as the rotor 7, within a circular chamber 6 in the block 5 (hereinafter known as the measurement block). As shown in FIG. 3, rotary movement is sensed by a proximity sensor 8 of magnetic, inductive or similar type connected to a microprocessor circuit 9 which, on the basis of the data determined by the sensor and a previously loaded program, measures the volumetric flow rate towards a destination point.

More specifically, the distributor block 1 comprises a duct 10 extending from the channel 3 and terminating in a chamber 11 in which a conventional needle valve 12 is located. The action of the valve 12 is to vary, by means of its valve head 13, the degree of closure of the duct 10. This action can be controlled by the operator by means of a handgrip 14. The valve can however be controlled by a motor means, such as a stepping motor, controlled by the microprocessor 9 on the basis of the signals from the sensor 8, or be controlled by another regulating member. The valve 12 has a stem 15 with a threaded part 17 for cooperation with a corresponding part 17 of the distributor block 1. The stem 15 terminates outside the block 1 in the form of the handgrip or knob 14. In addition, between the valve head 13 and the threaded part 16 there is a groove 18 containing a seal member or O-ring 19 by which the fluid which through the duct 10 enters the chamber 11 containing the valve 12 is prevented from escaping from the block 1.

From said chamber 11 there extends a duct 20 terminating in a port 21 provided in that surface 22 on which the measurement block 5 is located. At the port 21 there is a seal member or O-ring 23. In the surface 22 there is also a second port 24, in proximity to which there is a seal member or O-ring 25. A duct 26 extends from the port 24 to the exit bore 27 of the distributor block 1. Finally, the distributor block comprises through bores 28 to receive normal screws (not shown) for affixing it in its position of use, and through bores 29 to receive further fixing members for connecting the distributor block 1 to other blocks of like type, or other known distributor blocks.

The ducts 20 and 26 act as ducts for the feed and return of the fluid from the distributor block 1 to the measurement block 5 and vice versa. Thus in this embodiment the measurement block serves to measure the rate of a flow derived from the main flow through the channel 3 and directed towards a user item connected to the exit 27.

The measurement block comprises an interface element 30 provided with a flat circular base 31 on which there is a raised part 32 from which there projects a substantially cylindrical hollow part 33 within which a pin 34 is located in a substantially central position. This pin defines with the inner wall 35 of the cylindrical part 32 a guide track 80 within which the pin 36 of said rotor 7 moves. The track 80 is positioned concentrically to the chamber 6. The pin 36 extends from one face 37 of an intermediate baffle 38 of said rotor 7, an identical pin 39 extending from the opposite face 40 of said baffle to the face 37. Finally, the intermediate baffle 38 comprises a series of holes 41 and a droplet-shaped aperture 38A which opens into a slit 43 formed longitudinally in the rotor 7. The rotor 7 also comprises an inner wall 7A and an outer wall 7B.

In its raised part 32, the interface element 30 comprises recesses 44 in which there are provided holes 45 and 46 which when assembling the device of the invention are positioned to correspond with the ports 21 and 24 in the surface 22 of the distributor block 1. Finally, the interface element 30 comprises a groove 47 provided in the raised part 32 and also extending along the outer wall 48 of the hollow cylindrical part 33.

The groove 47, the aperture 38A and the slit 43 in the rotor 7 are arranged to receive a fixed rectangular baffle 50 projecting towards the interior of the chamber 6 of the measurement block 5 and extending from a wall 6A of the chamber. When the measuring device is assembled, said baffle 50 interrupts the connection between the holes 45 and 46 of the interface element 30 (these holes to be known hereinafter as the feed hole 45 from the distributor block 1 to the measurement block 5 and the exit hole 46 from the measurement block 5) and compels the fluid entering the block 5 to pass into the rotor 7 when the conditions described hereinafter prevail.

The measurement block 5 also comprises, within the chamber 6 and projecting from its roof 6B towards the chamber interior, a substantially cylindrical hollow part 53 coaxial to the described part 33 and partially embedded in the casing 5A of the measurement block 5. In the part 53 there is a pin 54 located in a substantially central position. The pin 54 creates with the inner wall 55 of the part 53 a guide track 90 for the movement of the pin 39 projecting from the intermediate baffle 38 of the rotor 7 which is identical to the already described track 80. Finally, the rectangular baffle 50 terminates with part of its inner side 56 against the outer wall 57 of the part 53 and its side 58 against the roof 6B of the chamber 6.

In a modified embodiment (not shown) the exit hole 46 is not provided in the interface element 30 but in the roof 6B of the chamber 6. From this hole, a duct extends through the casing 5A of the measurement block 5 and terminates in that surface 5H of the block which is in contact with the surface 22 of the distributor block 1 when the blocks 1 and 5 are assembled. The duct in the measurement block 5 terminates so that it mates with the port 24 provided in the surface 22 of the distributor block 1. Finally, the measurement block 5 comprises in an outer side 5B a seat 60 for the proximity sensor 8, this sensor being fixed to the casing 5A of the block 5 in known manner, and further comprises through bores 61 in the casing 5A to receive normal screws (not shown) for fixing the block 5 to the distributor block 1, these screws cooperating with blind holes 62 provided in said block 1 and opening into its surface 22. To prevent fluid seepage between the blocks 1 and 5 on assembly of the various elements of the device according to the invention, a seal element or O-ring 70 is provided about the base 31 of the interface element 30. As stated, said rectangular baffle 50 and the cylindrical parts 33 and 53 of the interface element 30 and, respectively, of the measurement block 5 act as guide tracks 80 and 90 for the movement of the rotor 7.

In this respect it will be assumed that the flow rate which is to be measured is that of a fluid moving within a hydraulic circuit into which the measuring device of the invention is connected, i.e. the flow rate of the fluid passing through the distributor block 1. It will also be assumed that the exit bore 27 of the block 1 is connected to a user item and the bore 4 of said block is connected to a pipe of said hydraulic circuit or to other units formed from distributor blocks and measurement blocks identical to those described.

On connecting the entry bore 2 to a fluid source, the fluid penetrates into the channel 3 and part of it penetrates into the duct 10 from which it reaches the chamber 11 in which the valve 15 is located. This valve is adjusted by the operator on the basis of the quantity of fluid which is to be fed to the user item through the exit bore 27.

Upon suitably adjusting the valve 12, the fluid enters the duct 20 and leaves the distributor block 1 through the port 21. At this point the fluid passes into the chamber 6 of the measurement block 5 by passing through the feed hole 45 in the interface element 30. If the rotor 7, the chamber 6 and the cylindrical parts 33 and 53 have been dimensioned so that during the rotation of the rotor, this latter element always has its outer part 7B tangential to the wall 6A of the chamber and its inner wall 7A tangential to the outer walls 48 and 57 of the parts 33 and 53 respectively, by obviously at continuously changing points, then during the operation of the device two chambers of variable volume are created within the chamber 6 and two within the rotor 7. Of each pair of said chambers, one chamber is connected to the feed hole 45 and the other to the exit hole 46. The pressure at the feed hole 45 causes the rotor 7 to rotate. When the point of tangency of the rotor 7 moves by the proximity sensor the signal emitted by this latter reaches the value required by the microprocessor 9 to be able to calculate the flow rate. The fluid contained in the chamber connected to the exit hole 46 discharges to the user item, and the same functioning applies to the fluid which reaches the interior of the rotor 7 while this interior is in communication with the feed hole 45 and exit hole 46.

If the indicated flow rate is greater than a maximum threshold value or, in particular, is less than a minimum threshold value, the microprocessor circuit 9 is made to signal in any known manner that the operation of the circuit is irregular, so enabling the operator to take action.

The measuring device as hereinbefore described is of simple construction and high reliability, and enables the flow rate of a fluid present in the hydraulic circuit or delivered to a user item to be measured accurately.

We I claim is:

1. A device for measuring the volumetric flow rate of a fluid, in particular a lubricant fluid in a hydraulic circuit, said device comprising:

(a) a circular rotor rotating eccentrically in a circular chamber under the action of pressurized fluid which enters and leaves at different points of said chamber;

(b) a fixed sensor located close to a point within said circular chamber, the cyclic rotation of said rotor causing it to approach said point so that the sensor generates a signal;

a distributor block provided with an entry bore and an exit bore;

a measurement block;

a feed duct and a return duct within sadi distribution block to and from said measurement block, said measurement block removably suppported by the distributor block;

said distributor block being provided with means for adjusting the fluid flow to the measurement block;

said sensor, the circular chamber and the rotor being located in said measurement block;

wherein said means for adjusting said fluid flow to the measuring block is a needle valve;

wherein the distributor block comprises a channel which opens into said entry bore, a duct connected to said channel and a chamber connected to said duct in which said means for adjusting said fluid flow to the measurement block comprising said needle valve are located, and comprising said feed duct extending from said chamber and opening into a port in that surface on which said measurement block rests on said distributor block, and said surface having a further port said distributor block having said return duct connecting with said further port and terminating in the exit bore such that said feed duct and said return duct respectively feed fluid from said distributor block to said measurement block and return fluid from said measurement block to said distributor block and said measurement block measures the volumetric flow rate of fluid flowing through said channel.

2. A device as claimed in claim 1, and further comprising microprocessor means which on the basis of proximity states measured by the sensor evaluates the volumetric flow rate of the fluid passing through the distributor block.

3. A device as claimed in claim 1, and wherein the distributor block has bores therein and comprises means for connecting said bores to pipes of a hydraulic circuit into which the device is connected and, respectively, to other distributor devices.

4. A device as claimed in claim 1, wherein the needle valve comprises a valve head acting on the duct which connects the chamber to the channel of the distributor block, and a stem with a threaded part and a groove, and a knob external to the distributor block, a seal member held in said groove being provided in said stem.

5. A device as claimed in claim 1, further comprising the measurement block having a seat therein for said fixed sensor means.

6. A device as claimed in claim 5, wherein the said fixed sensor is a proximity sensor of magnetic, inductive or similar functional type.

7. A device for measuring the volumetric flow rate of a fluid, in particular a lubricant fluid in a hydraulic circuit, said device comprising:

(a) a circular rotor rotating eccentrically in a circular chamber under the action of pressurized fluid which enters and leaves at different points of said chamber;

(b) a fixed sensor located close to a point within said circular chamber, the cyclic rotation of said rotor causing it to approach said point so that the sensor generates a signal;

a distributor block provided with an entry bore and an exit bore;

a measurement block;

a feed duct and a return duct within said distributor block to and from said measurement block, said measurement block removably supported by the distributor block;

said distributor block being provided with means for adjusting the fluid flow to the measurement block;

said sensor, the circular chamber and the rotor being located in said measurement block; and wherein said means for adjusting said fluid flow to the measuring block is a needle valve; and further comprising interface means comprising a feed hole and an exit hole arranged to engage the ports of the feed and return ducts of the distributor block, and a guide track for the guided movement of the rotor of the measurement block.

8. A device as claimed in claim 4, wherein said interface means comprise an element having a base and a raised portion porjecting therefrom into which the feed and exit holes open and said device comprises a hollow cylindrical part on said raised portion and a pin provided in a substantially central position therein.

9. A device as claimed in claim 1, wherein said pin and an inner wall of said hollow cylindrical part define a guide track within which a pin of the rotor of the measurement block moves.

10. A device as claimed in claim 9, wherein the rotor of the measurement block is of substantially cylindrical hollow form, said rotor comprising internally a perforated baffle, from the opposing faces of which there extend respectively the pin guided in the track of the interface means and said device further comprises another pin which slides in another guide track defined in the casing of the measurement block.

11. A device as claimed in claim 10, further comprising a part carried by said casing within said annular chamber in which the rotor moves, said part being substantially cylindrical and hollow, and comprising in its interior a pin in a substantially central position, said pin and the inner wall of said part defining said guide track.

12. A device as claimed in claim 7, in said circular chamber within which the rotor moves and integral with the casing of the measurement block, a baffle arranged to engage with a groove provided in the interface means and with a slit provided in said rotor.

13. A device as claimed in claim 7, further comprising microprocessor means which on the basis of proximity states measured by the sensor evaluates the volumetric flow rate of fluid passing through the distributor block.

14. A device as claimed in claim 7, wherein the distributor block comprises bores therein and comprises means for connecting said bores to pipes of a hydraulic circuit into which the device is connected and, respectively, to the other distributor devices.

15. A device as claimed in claim 7, wherein the needle valve comprises a valve head acting on the duct which connects the chamber to the channel to the distributor block, a stem with a threaded part and a groove, a knob external to the distribbutor block, and a seal member held in said groove provided in said stem.

16. A device as claimed in claim 7, further comprising the measurement block having a seat therein for said fixed sensor.

17. A device as claimed in claim 16, wherein said fixed sensor is a proximity sensor of magnetic, inductive or similar functional type.

* * * * *